United States Patent
Lecoffre et al.

(10) Patent No.: US 6,426,010 B1
(45) Date of Patent: Jul. 30, 2002

(54) DEVICE AND METHOD FOR SEPARATING A HETEROGENEOUS MIXTURE

(75) Inventors: Yves Lecoffre, Grenoble; Jean-Claude Gay, Les Essarts le Roi, both of (FR)

(73) Assignee: Total, Puteaux (FR)

( * ) Notice: Subject to any disclaimer, the term of this patent is extended or adjusted under 35 U.S.C. 154(b) by 0 days.

(21) Appl. No.: 09/554,495

(22) PCT Filed: Nov. 18, 1998

(86) PCT No.: PCT/FR98/02457

§ 371 (c)(1),
(2), (4) Date: Jul. 12, 2000

(87) PCT Pub. No.: WO99/25479

PCT Pub. Date: May 27, 1999

(30) Foreign Application Priority Data

Nov. 18, 1997 (FR) ............................................ 97/14419

(51) Int. Cl.⁷ ...................... B01D 21/26; B01D 17/038; B04B 11/02
(52) U.S. Cl. ...................... 210/781; 210/787; 210/188; 210/512.1; 210/512.3; 209/713; 209/715; 209/725; 209/730; 494/37; 494/45; 55/459.1
(58) Field of Search ........................ 55/459.1; 209/713, 209/715, 722, 725, 730; 210/781, 787, 188, 512.1, 512.3; 494/37, 45

(56) References Cited

U.S. PATENT DOCUMENTS

| 3,405,803 A | 10/1968 | Bahr et al. |
| 3,904,109 A | 9/1975 | Underwood |
| 4,148,735 A | 4/1979 | Laval, Jr. |
| 4,443,331 A | * 4/1984 | Armand .................... 210/512.1 |
| 4,846,780 A | 7/1989 | Galloway et al. |
| 5,180,257 A | 1/1993 | Narishima et al. |
| 5,320,500 A | 6/1994 | Cholet |

FOREIGN PATENT DOCUMENTS

| EP | 037 347 | 10/1981 |
| FR | 2 507 503 | 12/1982 |
| FR | 2 588 779 | 4/1987 |
| FR | 2 652 762 | 4/1991 |

* cited by examiner

Primary Examiner—David A. Reifsnyder
(74) Attorney, Agent, or Firm—Sughrue Mion, PLLC

(57) ABSTRACT

The invention concerns a device for separating the constituents of a heterogeneous mixture and its uses. Said device comprises a separation chamber (100, 250, 350, 450, 650, 724, 850, 903, 1106) having a one of its ends an inlet and at the other an outlet comprising a first ring-shaped orifice (110, 210, 310, 410, 510, 610, 710, 810, 919) coaxial with said chamber, and a second ring-shaped orifice (111, 211, 311, 411, 511, 611, 711, 811, 920) coaxial with said first ring-shaped orifice and whereof the external diameter is smaller than said first ring-shaped orifice internal diameter. The invention is characterized in that said separation chamber has a cylindrical shape and said first orifice external diameter $D_1$ is smaller than said chamber internal diameter $D_0$. The invention also concerns a method using said device.

33 Claims, 11 Drawing Sheets

Figure 1:
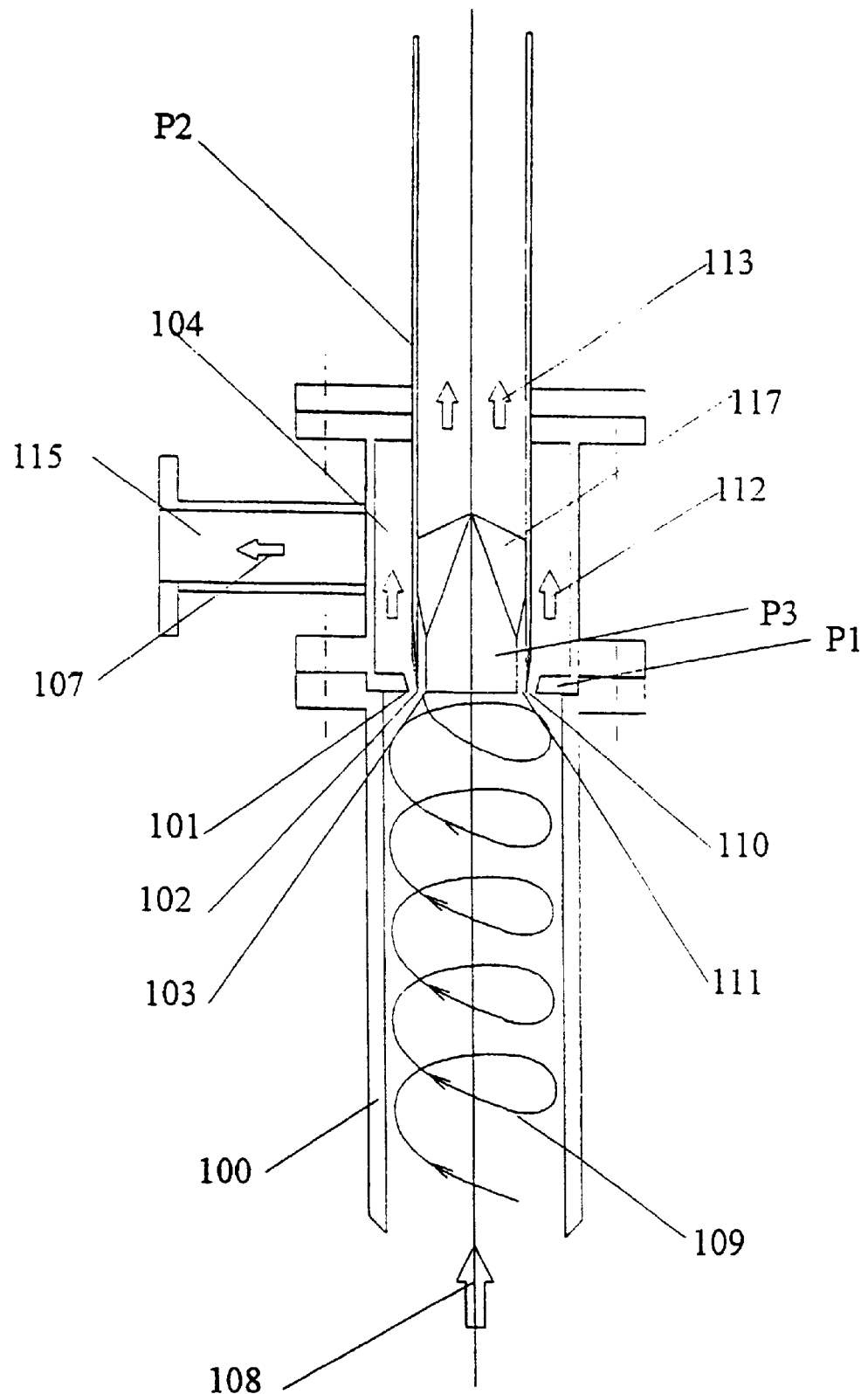

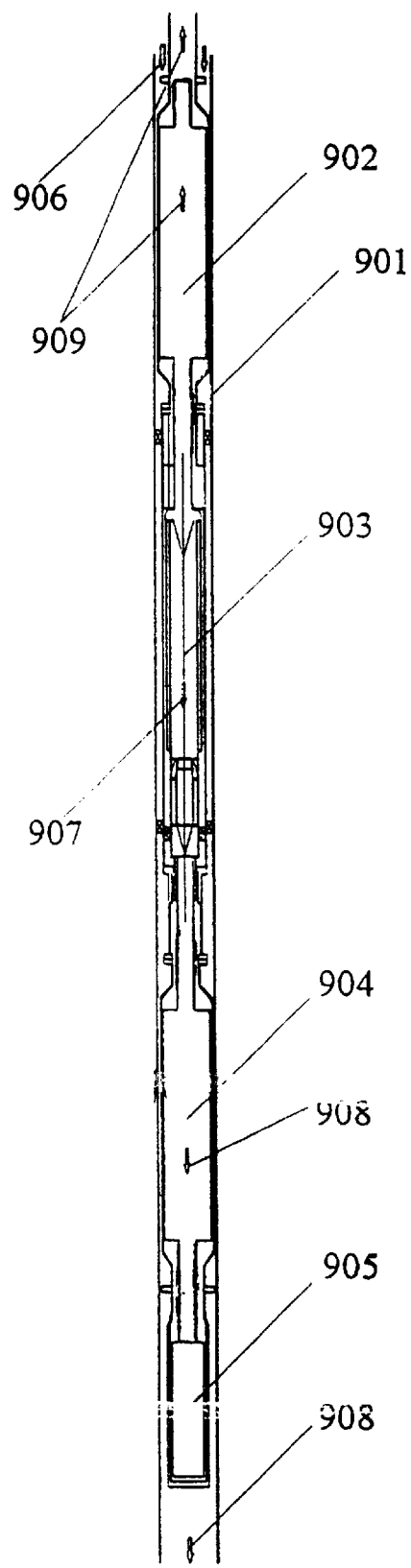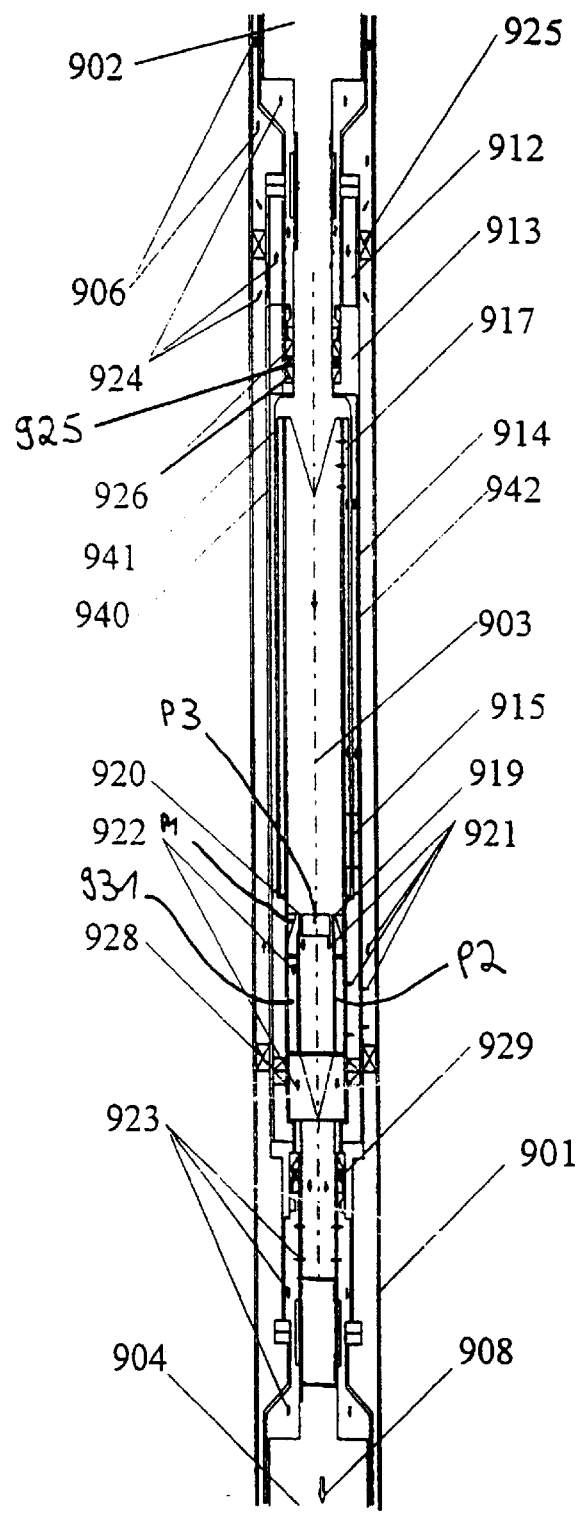
Fig. 9a                    Fig. 9b

DEVICE AND METHOD FOR SEPARATING A HETEROGENEOUS MIXTURE

The invention relates to a device for separating the components of a heterogeneous mixture and its uses.

In many industrial applications, we can be brought to separate at least two non miscible fluids, for example a gas and a liquid, two non miscible liquids or the phases of a ternary mixture made up of two liquids and a gas. Furthermore, often times the initial mixture contains solid particles we would prefer to introduce in one or the other of the separated fluids.

To perform this operation, several known procedures are used, among which are the following:

gravity separators. These are rather large devices in which the emulsion's residence time is of several tens of seconds. The corresponding technology is known and is part of the engineer's art. In particular, decanters equipped with internal parallel plates are used;

centrifuges. These are devices driven by a motor in which the heavy phases are centrifuged and the light phases are centripeted under the action of a rotating field of flow. The tangential velocity of the fluid in the device is proportional to the radius, which limits its efficiency.

cyclones. These are stationary devices in which the mixture is introduced around the circumference of the device tangentially to the wall farthest from the axis. This creates a flow whose tangential velocity increases as we get closer to the center of the device, or at least to the output ports. These output ports are located close to the axis of the device and the liquid passes through them following an overall axial direction. The efficiency of these devices is relatively good and they are mostly used to obtain the separation of solids and liquids, the sorting of particles based on their sizes or a liquid-liquid separation. Nevertheless, these cyclones do have certain disadvantages due to the friction of the fluid against the walls. This results in the creation of a strong internal turbulence which tends to remix the species, brake the rotation and produce significant losses of charges.

Furthermore, in a liquid-liquid separation, these traditional cyclones can only operate if their size is small, typically less than 80 mm in diameter. Therefore, it is essential they be placed side by side if we wish to have significant flows pass through. This is very limiting when we are for example trying to perform a water-oil separation at the bottom of an oil well;

the rotating separator with a longitudinal peripheral feed. This is a separator whose walls rotate around an axis like those of a centrifuge, where the separation takes place in a cylindrical chamber, and the feed of said chamber follows an axial direction through canals parallel to the rotation axis located around the circumference of the cylindrical chamber, and the separated fluid exits through cylindrical ports pierced at the extremities of the rotating chamber. Such a separator is described in the French patent number 2 592 324 filed on Jan. 2, 1986 whose inventors are Y. Lecoffre and J. Woillez. They make it possible to execute an entry in the rotating mark following an axial direction so that in the absolute mark, the fluid enters with a rotation velocity almost exactly equal to that of the cylindrical chamber. This makes it possible to strongly limit the tangential friction on the walls of the chamber. We then obtain a field of velocities in the Vortex type chamber in which the tangential velocity is inversely proportional to the radius. Therefore it increases rapidly as we get closer to the center of the device, which results in spectacularly increasing the radial migration velocities of the globules to be separated.

The device performs a very efficient separation despite the fact that the residence times are close to one second. Therefore it is particularly compact. Furthermore, and this is one of the most significant characteristics, it can operate in a wide range of flows of the entry mixture, whose ratio between the extreme flows is greater than 20. In its current versions of separation of two non miscible liquids, this separator has the following disadvantages:

the separated light liquid always contains a significant and often predominant quantity of heavy liquid;

the losses of charges on the heavy liquid are relatively significant;

the losses of charge on the light liquid are practically double the losses of charge on the heavy liquid. Thus, in certain cases, we reach losses of charge of approximately ten bars;

the device only treats mixtures that contain a small quantity of light liquid, typically in the 1 to 3% range;

the device is driven via a motor placed laterally and a belt, which strongly increases its lateral congestion and prohibits its use in pipes with small diameters, as is the case in the oil industry.

The American patent number 3 405 803 relates to a vortex separator for the clarification of a suspension that contains particles. This separator has a vortex chamber 1 with a tapered lower part, the evacuation of the clarified suspension takes place on the same side as the introduction of the suspension to be clarified. Only the heavy particles are eliminated through the extremity 3 of the vortex chamber 1 on the side opposite that of the introduction of the suspension to be clarified.

Such a separator, if it makes possible the clarification of a suspension that contains particles, does not however perform a real separation of the components of the suspension.

The application for the European patent published under number 37 347 proposes a procedure and a device for separating the particles in a fluid. The procedure requires that the suspension to be treated be introduced following a direction that is slightly oblique in relation to the longitudinal axis of the enclosure, so that is has an initial angular velocity that is greater than the angular velocity of the enclosure. The device (FIGS. 1, 5, 7 8, 9) consists of a tapered revolution enclosure 1 that rotates around its axis, an outlet 12, 13 of the purified suspension and the separated fractions located at the extremity opposite that of the enclosure where the inlet 8 of the suspension is located, where the outlet 12 of the heaviest fraction is located around the circumference of the enclosure, meaning that its outside diameter is equal to the inside diameter of the enclosure 1. Furthermore, this outside diameter of the outlet 12 is even often increased by an enlargement of the enclosure at the level of this outlet 12, as can be seen in FIGS. 1, 5 and 7. These arrangements prevent the development of a cyclonic effect necessary to obtain a good separation. Furthermore, the device proposed in this application for European patent calls for an auxiliary fluid, it must have large dimensions and it operates with a low average centrifugal acceleration and a long residence time.

The object of this invention is to remedy the aforementioned disadvantages. Therefore it relates just as well to rotary separators with a peripheral feed as it does to stationary separators provided they operate with unusual characteristics. Therefore this invention intends to answer the following needs:

limit the losses of charge:
be able to integrate the separator in pipes with small diameters and especially an oil production well pipe;
make it possible to separate the fluids contained in liquid-liquid mixtures rich in one or the other of the components;
be able to integrate the separator to a pump shaft line in the case of a rotary separator;
be able to separate solids;
reinject the separated solids in one or the other of the liquid phases;
separate gases;
perform a separation of gases, then of the liquids and the solids in an integrated device;
integrate a finish separator on one or the other of the liquids to be separated;
implement means for regulating the flows of liquid;
implement arrangements that make it possible to limit the fluctuations of concentration at the inlet of the separator;
implement arrangements that make it possible to optimize the feeding conditions of the device.

In the existing devices, the output of the less dense liquid usually takes place through pipes of small diameter sometimes located on the same side as that of the entry of the mixture, sometimes on the opposite side from the entry of the mixture. Furthermore, these devices always operate with a reduced ξ flow of less than 0.1. This ξ parameter is determined by $$\xi = \frac{Q}{\pi R_0^2 V_{TO}^2}$$

where Q is the flow in m³/s, $R_o$ is the external radius in meters at the entry of the pipe in which the separation takes places and $V_{TO}$ is the tangential velocity in meters per second at this same point. The consequence of this conception is that the frictions in the device are very strong due to the low value of the flow coefficient. Furthermore, despite this strong friction the losses of charge are also significant because recuperation of the light liquid in done at the point where the pressure in the separator is the weakest, meaning on its axis. Lastly, a considerable quantity of heavy fluid passes through the output of the light liquid because of the recirculations that take place in the output of the heavy liquid. Therefore, we always collect a light liquid charged with heavy liquid.

We are aware of, through EP-A- 0 037 347, a device for separating the components of a heterogeneous mixture, where this device consists of a separation chamber that has at one of its extremities an inlet and at the other of its extremities an outlet that consists of a first annular orifice, coaxial to said chamber, and a second annular orifice, coaxial to said first annular orifice and whose outside diameter is less than the inside diameter of said first annular orifice, and where said separation chamber has a cylindrical shape and the outside diameter of said first annular orifice is equal to the inside diameter of said chamber.

This invention is interested in this general type of device and it is characterized by the fact that the separation chamber has a cylindrical shape, and by the fact that the outside diameter $D_1$ of the first annular orifice is less than the inside diameter Do of the chamber and that the outlet of the separation chamber has:

a peripheral annular piece that extends from the wall of the separation chamber toward the axis of this chamber,
a piece that is essentially cylindrical,
a central piece with a circular transversal section,
where the essentially cylindrical piece is arranged between the peripheral annular
piece and the central piece, and the three pieces are coaxial to the separation chamber, in such a way that
the first annular orifice is comprised of the space between the peripheral annular piece and the piece that is essentially cylindrical, and
the second annular orifice is comprised of the space between the essentially cylindrical piece and the central piece.

The characteristics of the device as set forth in the invention lead to the aspiration of the light fluid, not at the center of the turbulent flow where the pressure is minimal, but following a larger radius for which the pressure is stronger which limits the losses of charge.

The separation chamber has a circular transversal section. It can be essentially cylindrical, but, contrary to what can be seen in the devices of the prior art, according to the invention, tapered shapes are to be avoided. Furthermore, the inlet and the outlet are axially separated which allows the separation to take place correctly between them.

Furthermore, an important characteristic as set forth in the invention is that the first annular orifice, namely the one that has the largest average diameter, must have a outside diameter that is less than the inside diameter of the separation chamber, this in order to obtain a satisfactory cyclonic effect.

The first annular orifice or outlet ring of the heavy liquid must be sized so that the heavy liquid exists the separator at any point of this ring and that there be no recirculations as is the case in the traditional cyclones.

In this presentation, by "width of a ring" we mean the difference of the diameters of the two circles that bound it.

For a ring with a given width, there is a minimum flow that makes it possible to meet these conditions. Therefore we always try to work at a flow rate that is greater than this minimum heavy liquid outlet ring charging flow. This minimum flow can be determined either by calculation or from experiences. For example, for a cyclone with rotating walls with an outside diameter $D_0$ equal to 100 mm, rotating at 3000 tr/min, this minimum flow with a ring with an outside diameter equal to 70 mm and a width that is equal to 5 mm is in the range of 10 l/s. This minimum flow can be adjusted by a simple variation of the width of the heavy liquid outlet ring.

The inside diameter $D_3$ of the second annular orifice or outlet ring for light liquid consists of the lower limit for which the flow is in a vortex type rotation. When we have a larger diameter, the flow in the separator is healthy and the separation is done correctly. For smaller diameters, the flow in the separator transforms itself into an area of dead liquid where the distribution of the tangential velocity is proportional to the current radius; this area is also called in solid rotation. From the point of view of the separation, this area is useless and, considering its low volume, its efficiency in the matter of separation is more or less non existent. We can say that, from a practical standpoint, a cyclone whose diameter $D_3$ is at the most equal to half the outside diameter of the separator has performances in separation that are as good as if $D_3$ were very small, but its losses of charge are very much less, for example two to ten times less than those of a traditional cyclone, with stationary or rotating walls. Always very important, the loss of charge of a cyclone only depends on the flow coefficient ξ and the ratio $$\delta = \frac{D_0}{D_3}.$$

In practice, the loss of charge varies as $\delta^2$ when the extraction ring of heavy liquid has no recirculations. The smaller the diameter of the extraction pipe of the light liquid, the higher the loss of charge, this tendency is perfectly confirmed by the tests available in the literature.

Lastly, the quality of the separations, and, in particular, the residual rate of heavy liquid in the light liquid depend on the presence or absence of recirculations in the heavy liquid outlet. In the absence of recirculation, we can hope to extract a light product that is almost pure.

Through this presentation we understand the importance of the outlet ports on the performances of a liquid-liquid separator.

The device as set forth in the invention can therefore be used to treat a mixture that consists of two non miscible liquids with different densities that possibly contain a gas or a mixture of gas and/or solid particles.

The invention also relates to a procedure for separating the components of a heterogeneous mixture, where:

we introduce the mixture to be treated at the entrance of a device consisting of a separation chamber with at one of its extremities an inlet and at the other extremity an outlet consisting of a first annular orifice coaxial to said chamber and a second annular orifice coaxial to said first annular orifice and whose outside diameter is less than the inside diameter of said first annular orifice, where said separation chamber has a cylindrical shape and the outside diameter $D_1$ of said first annular orifice is less than the inside diameter $D_0$ of said chamber; whereas the outlet of the separation chamber has:

a peripheral annular piece that extends from the wall of the separation chamber toward the axis of this chamber, a piece that is essentially cylindrical, a central piece with a circular transversal section, where the essentially cylindrical piece is arranged between the peripheral annular piece and the central piece and the three pieces are coaxial to the separation chamber, in such a way that the first annular orifice is comprised of the space between the peripheral annular piece and the essentially cylindrical piece, and the second annular orifice is comprised of the space between the essentially cylindrical piece and the central piece;

and we recuperate a heavy fraction through said first annular orifice and a light fraction through said second annular orifice.

According to a first method of execution of the invention, the inlet of the mixture into the separation chamber takes place through rotating peripheral canals of which at least the outlet is parallel to the rotation axis of the separator, where this separator also rotates.

According to a second method of execution of the invention, the inlet of the mixture into the rotating chamber in done through rotating radial canals, where the liquid was previously thrown by friction against rotating walls located outside the chamber itself.

According to a third method of execution of the invention, the inlet of the mixture is done through several orifices pierced in the wall of the separator, into the area of entry opposite the outlets, where these orifices penetrate tangentially into the separation chamber that is stationary.

According to a fourth method of execution of the invention, the separation chamber is stationary, but the mixture is injected into a feeding chamber whose diameter is greater than that of the actual separation chamber. This arrangement makes it possible to limit the velocities at the inlet of the device and the cumbersome emulsification that can result therefrom.

According to a fifth method of execution of the invention, a small quantity of gas is injected into the central part of the device, where this arrangement makes it possible to avoid the creation of turbulence between the heart of the solid rotation flow and the external healthy area. In some cases, it is not necessary to inject this additional gas and the gas that is naturally present at the inlet is sufficient. In this last case, if the gas flow is too strong it can be extracted through a pipe located at the center of the separator.

According to a sixth method of execution of the invention, the device is equipped with one or more additional peripheral outlets that make it possible to collect the particles and a certain quantity of heavy fluid and introduce this mixture into either one of the flows extracted at the center of the device.

According to a seventh method of execution of the invention, the dimensions of the outlet ports can be regulated continuously by an action on the circular separation lip of the two flows.

Figure 2:
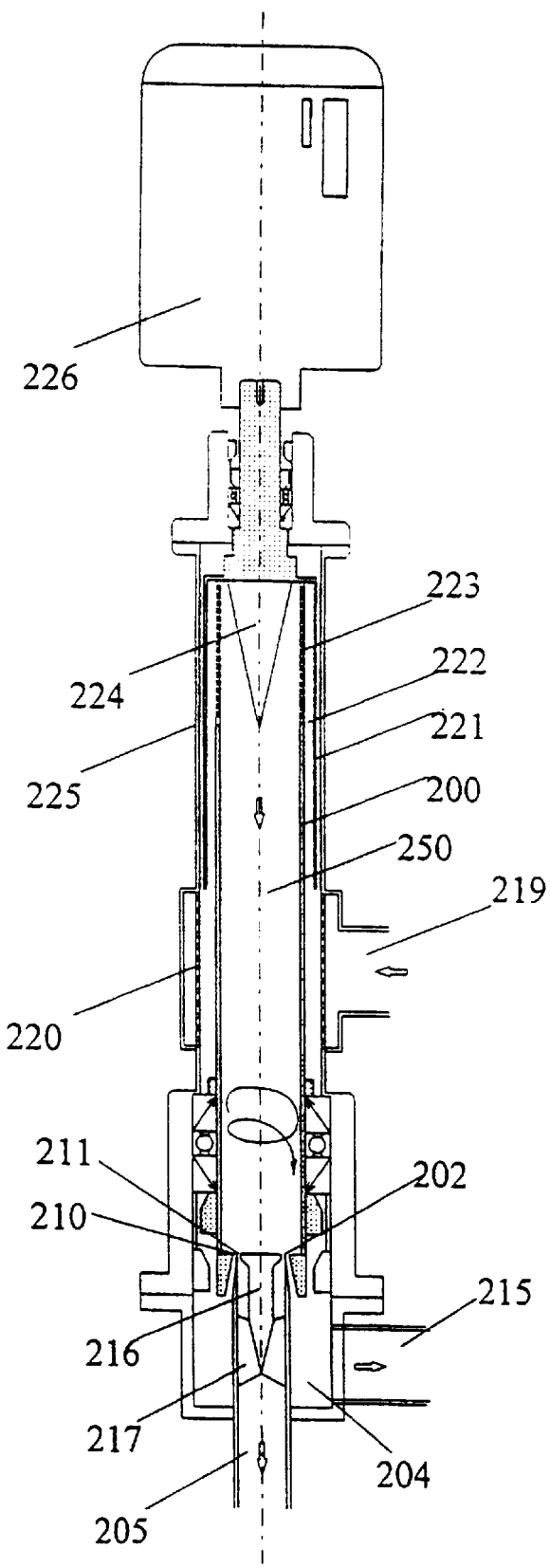
Figure 3:
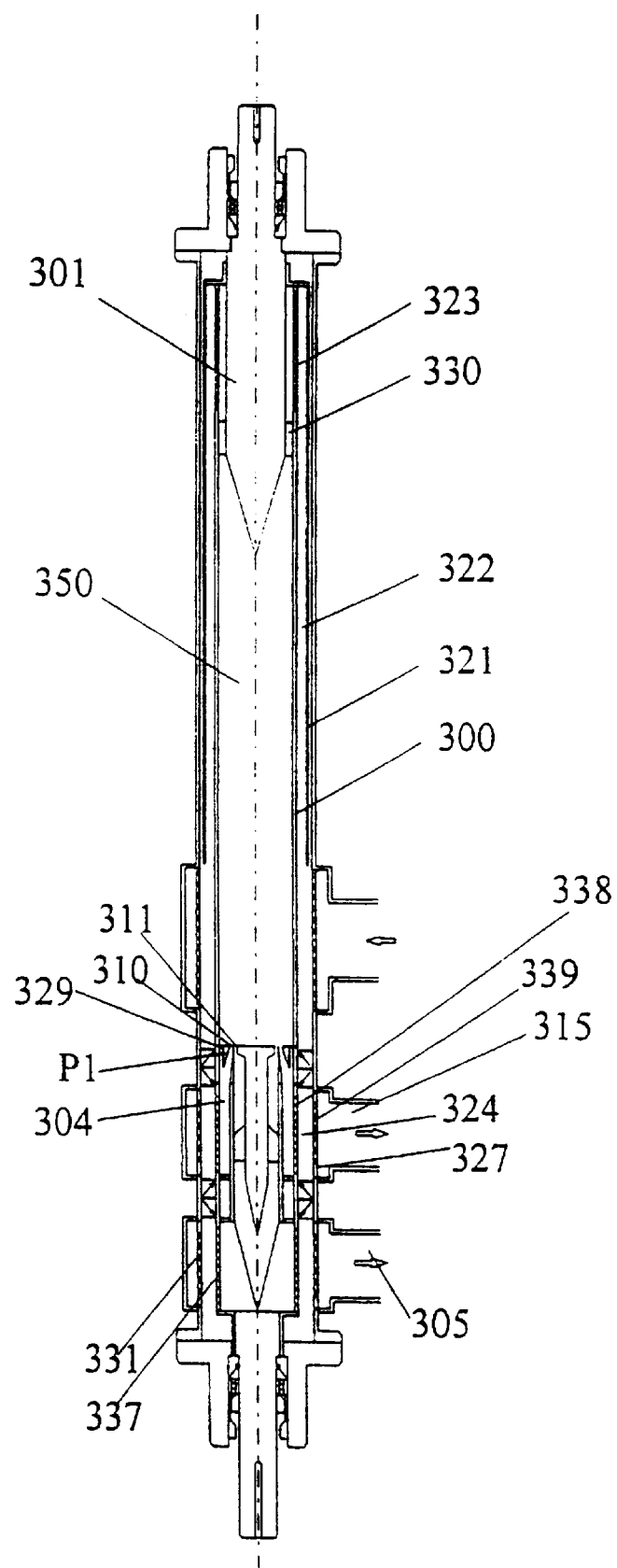
Figures 4A, 4B:
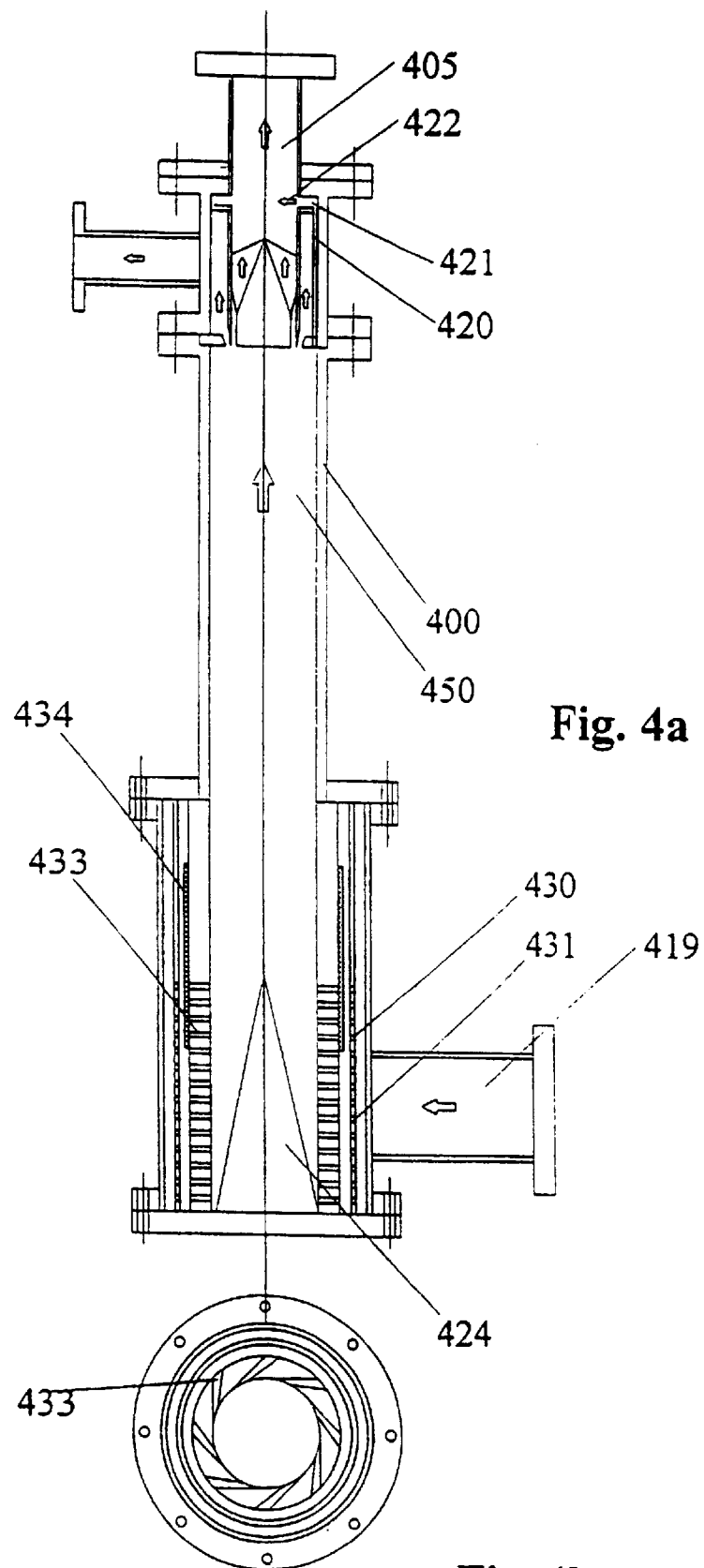
Figure 5A:
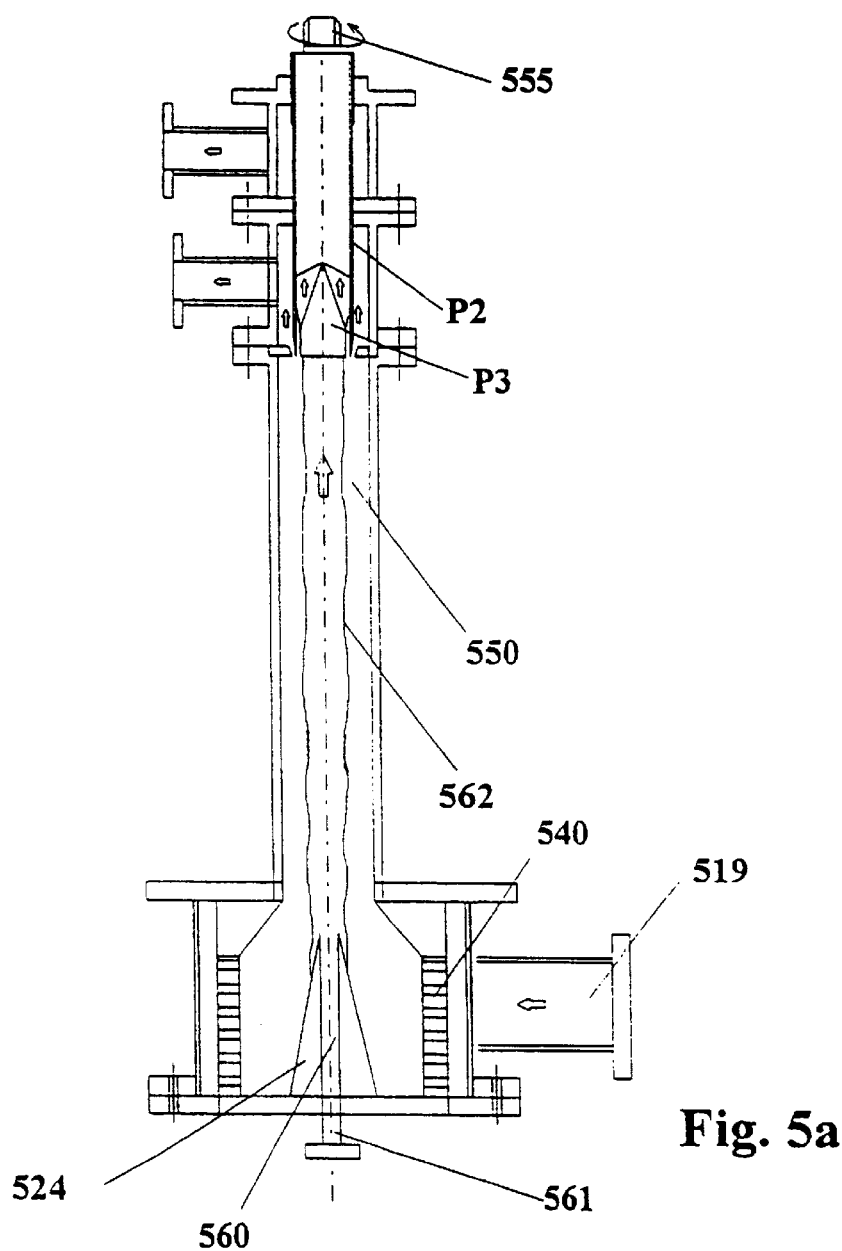
Figure 5B:
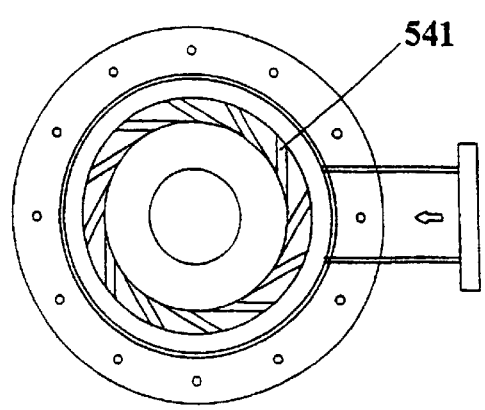
Figure 6:
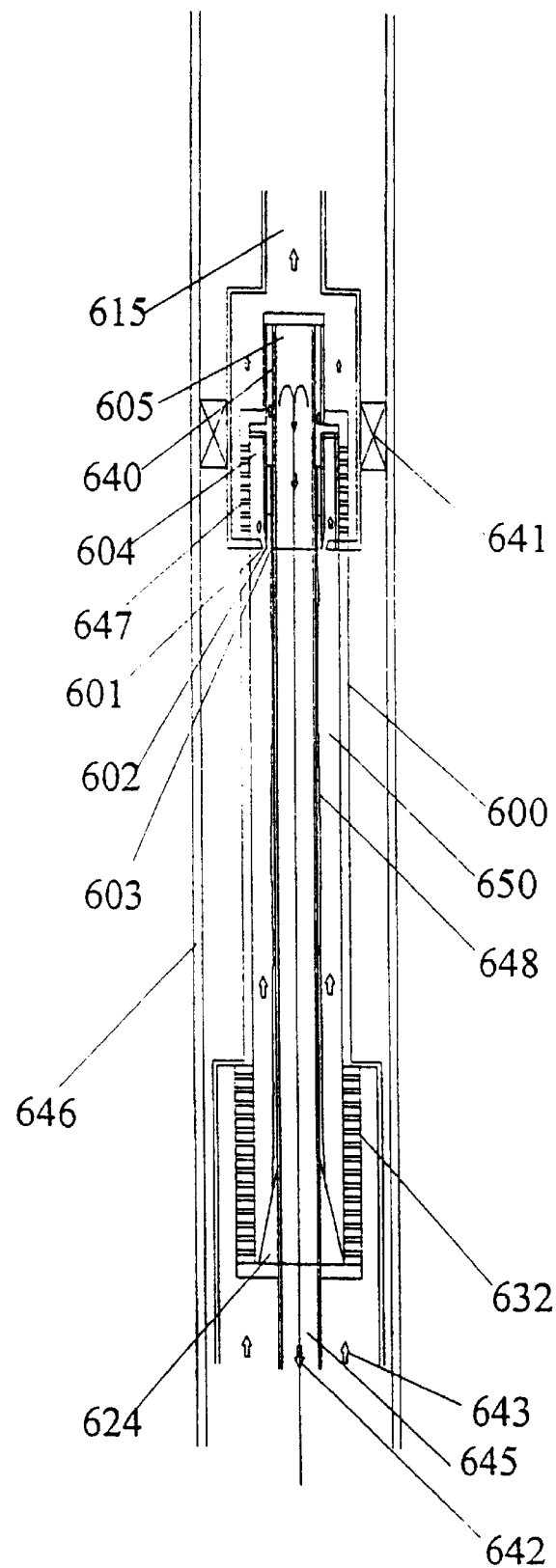
Figure 7A:
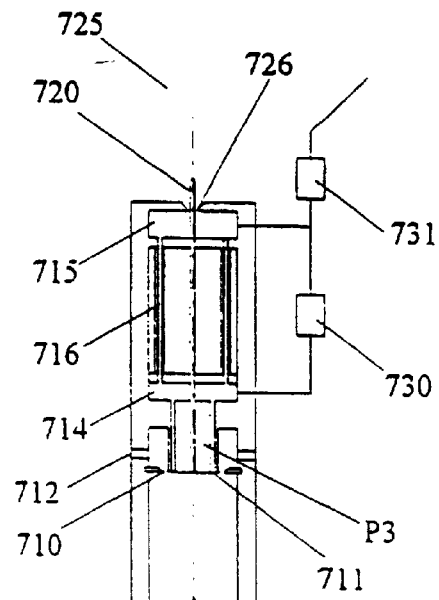
Figure 7B:
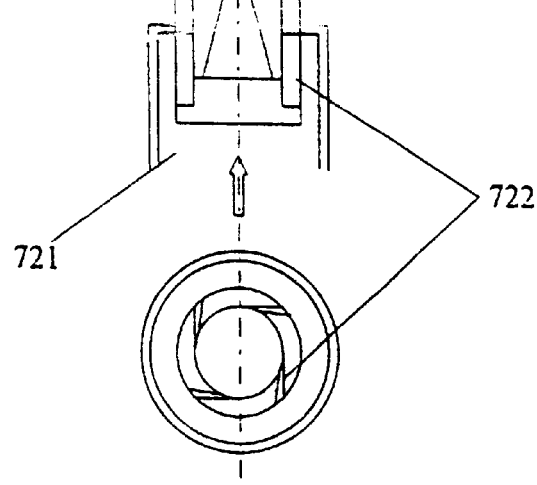
Figures 8A, 8B:
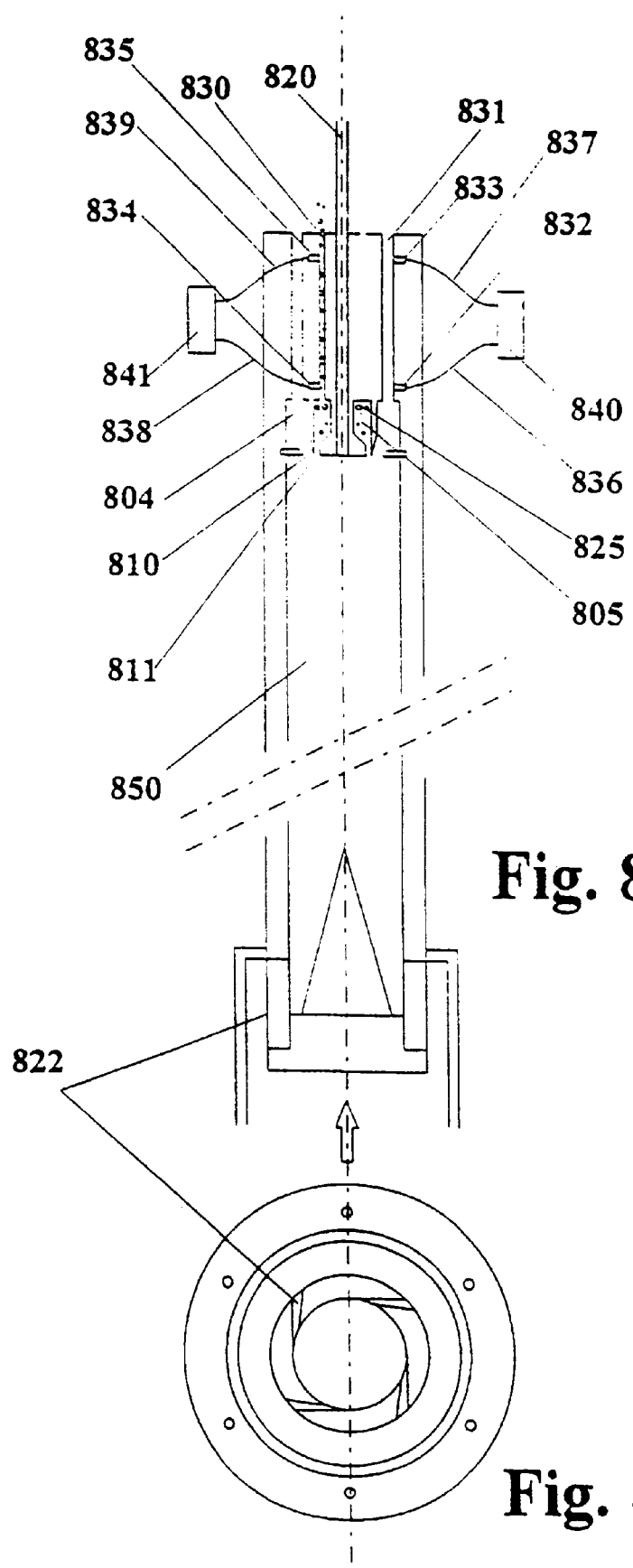
Figure 10:
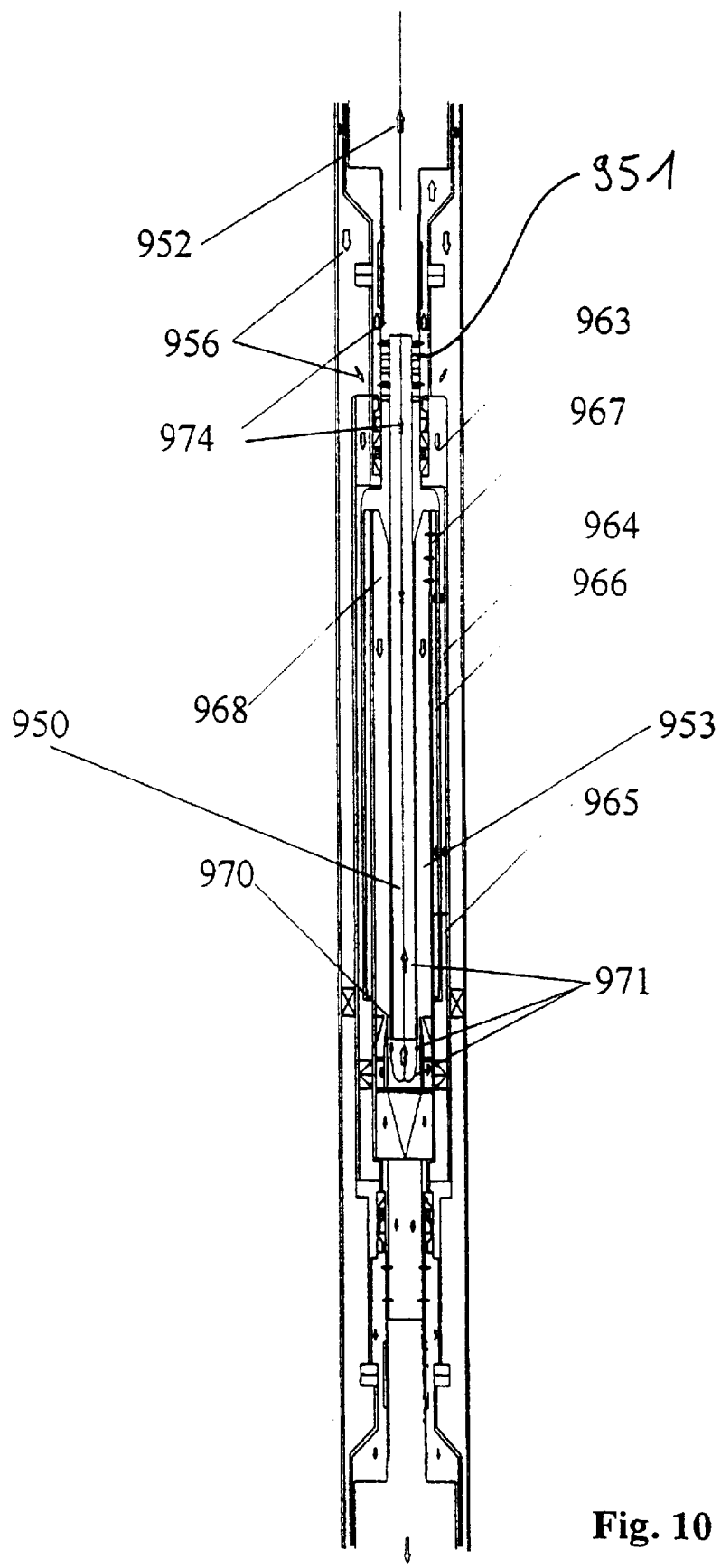
Figures 11A, 11B:
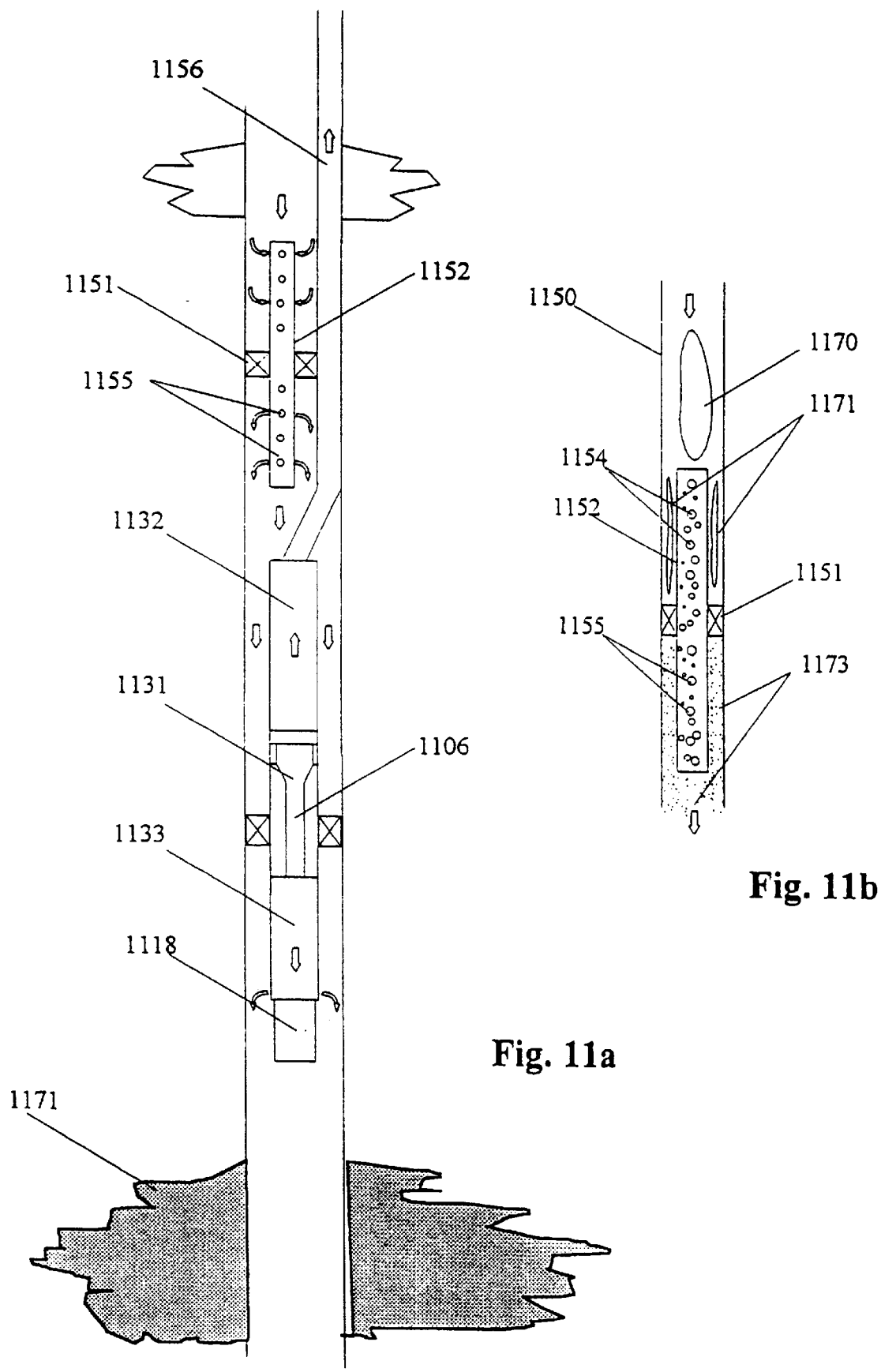

Other characteristics and advantages of this invention will become clearer after reading the following presentation of several methods for implementing the invention; these are provided as examples only and are not to be construed as restricting in any way. The description refers to the attached figures among which:

FIG. 1 is a schematic representation of the principle of the invention in which are represented the two outlet rings separated by a coplanar circular lip;

FIG. 2 schematically represents the first method of execution in which the rotation takes places in a rotating separator fed by radial peripheral entries preceded by a friction starter;

FIG. 3 schematically represents the second method of execution of the invention in which the rotation takes place in a rotating separator fed through axial peripheral inlets. The device is equipped with peripheral outlets that make is possible to introduce the separated particles in the heavy fluid outlet flow;

FIGS. 4a and 4b schematically represent a front view and a bottom view respectively of the third method of execution of the invention in which the separator is stationary and where the rotation takes place through orifices pierced in the inlet shell that tangentially penetrates the separation chamber. The device is equipped with a solid particle evacuation circuit in the light fluid outlet flow. The inlet can be regulated by adjusting the number of orifices;

FIGS. 5a and 5b schematically represent a front view and a bottom view respectively of the fourth method of execution of the invention in which the feeding takes place through multiple tangential inlets that open into a cylinder whose diameter is greater than that of the actual separation chamber. Furthermore, this device is equipped with an axial gas outlet;

FIG. 6 schematically represents the fifth method of execution of the invention in which an injection of air designed to reduce the frictions is provided and where the output of light fluid takes place through piping surrounded by an air duct;

FIGS. 7a and 7b schematically represent a front view and a bottom view respectively of a device as set forth in the invention equipped with means of detecting the presence of light liquid in the heavy liquid;

FIGS. 8a and 8b schematically represent a front view and a bottom view respectively of another device as set forth in the invention equipped with means of detecting the presence of light liquid in the heavy liquid;

FIG. 9a schematically represents a variant of the device as set forth in the invention that can be used in an oil well;

FIG. 9b schematically represents a blow up of one section of the device of FIG. 9a;

FIG. 10 schematically represents another version of the device as set forth in the invention that can be used in an oil well;

FIG. 11a schematically represents a device as set forth in the invention, preceded by a mixer;

FIG. 11b is a blow up of a section of FIG. 11b, showing the mixer in more detail;

The separation device as set forth in the invention will now be described in detail while referring to the attached FIGS. 1 through 11.

FIG. 1 shows a unit that consists of the separation chamber 100 with an outside diameter $D_0$, a peripheral annular piece or part P1 that extends from the wall of the separation chamber 100 to the axis of this chamber 100, an essentially cylindrical piece P2, a central piece P3 with a circular transversal section.

The essentially cylindrical piece P2 is arranged between the peripheral annular piece P1 and the central piece P3 and the three pieces are coaxial to the separation chamber 100. The first annular orifice or ring 100 consists of the space between the peripheral annular piece P1 and the essentially cylindrical piece P2, and the second annular orifice or ring 111 consists of the space between the essentially cylindrical piece P2 and the central piece P3.

The annular orifices or rings are bound by the circles 101 with a diameter $D_1$, 102 with a diameter $D_2$ and 103 with a diameter $D_3$. The ring 110 located between the circles 101 and 102 opens into the collection chamber 104 that communicates with the evacuation conduit 115; the ring 11 is bound by the circle or extremity 102 and the circle 103 comes out inside the cylindrical piece P2.

The mixture to be separated moves toward the outlet of the separator in the general direction 108 following helical trajectories shown in FIG. 1 by the spiral 109. Because of this turbulent flow, the lightest fluid has a tendency to gather toward the center of the separator and the heaviest fluid gathers toward the outside. As this separation is done by the association of the organs located upstream and the separation chamber, the only thing left to do is draw the flows of both species symmetrically in relation to the axis. By adjusting the downstream pressure in the conduit 115, for example using a valve, we can modify the flow of the heavy phase that passes, at least partially, through the ring 110. Similarly, by adjusting the pressure downstream from the cylindrical piece P2, we can modify the flow that passes in the ring 111 through which passes all or part of the light fluid. When the feeding conditions of the device are constant, we understand that it is possible to ensure that the entire light phase passe in the ring 111 and that heavy phase flow passe in the ring 110.

The central piece P3 takes on the shape of a full cylinder of which the extremity that is located on the side of the separation chamber 100 is essentially perpendicular to the axis of this chamber and creates a flat bottom. The other extremity of the full cylinder is extended by a tapered part. The central piece P3 has an axial length that is less than that of the cylindrical piece P2. At least two fins 117 are attached to the central piece, usually on its tapered part.

The light fluid is eliminated following the arrows 113 and the heavy fluid following the arrows 112 then 107.

Thus, the fluid located inside the outside diameter $D_3$ of the central piece P3 supported by the fins 117 rotates in a solid rotation and therefore mixes a little with the flow of the lightest fluid. This can cause slight perturbations especially if the follow of light fluid is weak. The line of separation between the flows of the heavy fluid and the light fluid automatically positions itself on the extremity 102, preferably tapered, and constitutes a circular sampling lip whose thickness e is always very low.

As an illustration of dimensions, we can envisage a diameter $D_0$ of 100 mm, a diameter $D_1$ of 70 mm, a diameter $D_2$ of 60 mm and a diameter $D_3$ of 50 mm. The thickness e of the sampling lip 102 can be of 2 mm.

In FIG. 2, we have represented the rotating separation chamber 250 in a stationary envelope 225 and driven by a motor 226. A shell 221 integral with the separation chamber 250 extends over part of this chamber, from its entry, and surrounds it leaving an annular clearance 222. Therefore, this shell 221 is surrounded by the envelope 225 from which it is separated by an annular space. The separation chamber 250 is free in rotation in relation to the envelope 225. The latter has an essentially cylindrical shape, it extends beyond the shell 221 and along the axis of the separation chamber 250 and is equipped with perforations 200.

The mixture is introduced in 219 through perforations 220, between the separation chamber 250 and the envelope 225. It then penetrates into the annular clearance 222 provided between the wall 200 of the separation chamber 250 and the rotating shell 221. In this annular clearance, the mixture is progressively put in rotation by friction.

When the mixture arrives plumb above the radial perforations 223 at the inlet of the separation chamber 250, its angular velocity is practically equal to that of the body of the separator.

This makes it possible to introduce the mixture in the internal part of the separation chamber 250 without shocks through the radial perforations 223, where these perforations preferably have a length that is several times greater than their diameter. The cumulated surface of the perforations is sufficiently significant for the velocity of entry into the chamber to be weak, for example 10 times less than the peripheral velocity, so that the angular velocity of the mixture at the entry will be exactly equal to that of the rotating part. The inlet of the separation chamber is advantageously equipped with a tapered or diagonal part 224 coaxial to the separation chamber and attached to the latter, making it possible to guide the mixture during its introduction into the chamber.

With an entry of this type, the tangential velocity of the mixture in the rotating chamber is practically inversely proportional to the radius. Therefore it increases strongly as we get closer to the center.

This conduit has very significant centripeted accelerations that are favorable to the separation of the phases. During its stay in the rotating chamber, the mixture separates into two flow tubes, one containing the heavy phases and the other the light phases.

The efficiency of the separation depends on the average granulometry of the mixture according to laws known to the man of the art, and, most particularly the law of Stokes. This carried mixture is then aspirated at the outlet of the chamber as indicated in the description of FIG. 1.

The heavy phase then passes in the ring 210 and the light phase passes in the ring 211. The heavy phase is then eliminated through the collection chamber 204 then through the evacuation conduit 215. The light phase passes in the ring 211 and is then evacuated through the piping 205. The central piece consists of the ogive 216 that bounds the ring 211 and is held in place by the fins 217. We must note that, on the side of the separation chamber 250, the cylindrical part that contains the collection lip 202 and the ogive 216 do not rotate in this example, which simplifies the construction of the device.

FIG. 3 provides another method of execution of the device. The general flow goes from top to bottom in the figure. The rotation takes place, as in the previous case, in a rotating separator fed using parallel axial canals 330 formed by the fins located between the wall 300 of the separation chamber 350 and the ogive 301.

The mixture is thrown using the friction delivery system comprised of the annular clearance 332 between the wall 300 and the shell 321, then it passes through the perforations 323 of the canals 330 before entering the actual rotating separation chamber 350. It then exists through the outlet rings 310 and 311. In this execution, the collection chamber 304 is integral in rotation with the separation chamber 350 and equipped with orifices 338 that open into an intermediary chamber 324 of which one free wall 327 in rotation in relation to the separation chamber 350 contains a grid 339 that opens onto the evacuation conduit 315.

Orifices 329 are provided at the outlet of the separation chamber 350, in the peripheral annular piece P1, preferably close to the wall 300, to evacuate a portion of the heavy fluid flow that can then carry away the solid particles that are more dense than it is. The heavy liquid thus charged with solids is then evacuated through the perforated rotating grid through the orifices 338, then through the stationary grid 339 and lastly through the piping 315.

As an example, for a separator with a 100 mm diameter we can envisage putting in place 6 tubes for the evacuation of solids each with a diameter of 3 mm. The evacuation of oil is done, in this case, through the rotating grid 337 integral with the separation chamber 350, the stationary grid 331 (free in rotation in relation tot he separation chamber 350) and the piping 305.

In FIGS. 4a and 4b, the separator is stationary. It is fed in emulsion through the piping 419, then through the grid or distribution shell 431 equipped with orifices 430. The emulsion then penetrates in the stationary separation chamber 450 bound by the wall 400 through several perforations 433 that are small converging canals 433 that open tangentially into the separation chamber 450, whose role is to progressively accelerate the emulsion velocity in order to minimize the shocks at the entry of the separator.

In the execution being proposed, there are 112 of these canals, distributed among 14 rows and 8 canals. This arrangement makes it possible to introduce the emulsion in a very homogenous and symmetrical manner in relation to the axis of the separation chamber 450. As a variant, we can use a set of slots, or even tangential cylindrical orifices drilled in the wall 400 of the separator. A stabilizing ogive 424 with a tapered shape is installed.

In addition, the device is equipped with a cylindrical obturator 434 movable in relation to the chamber 450, whose control is not represented, and which is arranged so as to make possible to obstruct all or part of the inlet perforations 433 in order to make their total surface vary. Therefore we can modify the flow that passes in the device upon demand, and, most of all, adapt the velocity of entry into the separator at the outlet of the canals 433 to the flow that passes in the device, where one of the rules to apply could be that this velocity be constant when the flow varies for an emulsion with given characteristics. This characteristic has very important advantages compared to the conventional non adjustable cyclones.

In FIG. 4a, the output is of the type described in FIG. 1, with the difference that part of the water flow is made to pass through the tubular peripheral canals 420 that feed the chamber 421 then through the oil outlet 405 following the arrows 422. This water flow carries a flow of solids that may otherwise remain stuck against the external wall of the separator 400 and would obstruct little by little the passage of the fluids.

In the example that is chosen, the dimensions of the separation chamber are 400 mm in length, 50 mm in diameter. The outlet surface of each of the 112 tangential inlet canals is a square with a diameter of 2.5 mm. The nominal flow of the device is an emulsion of 5 l/s when all the canals are open and the minimal flow is of approximately 1 l/s. The approximate range of the coefficient $\xi$ that is used is between 0.1 and 0.4. The characteristic diameters $D_0$, $D_1$, $D_2$ and $D_3$ are of 50 mm, 35 mm, 30 mm and 25 mm respectively. This sizing must make it possible to separate any drop whose diameter that is less than 100 microns in an emulsion with a difference of density between the phases that is equal to 150 kg/m$^3$.

FIG. 5 represents a stationary device fed by multiple perforations 541 that are tangential canals 541 pierced at the level of the inlet to the separation chamber 550, in the entry shell 540, whose diameter is greater than that of the remainder of the separation chamber 550. This characteristic makes it possible to obtain a same rotation intensity in the separation chamber by limiting the entry velocities and therefore the emulsification of the fluid. The number of orifices can be adjustable although this possibility is not represented in this figure. The output of oil takes place inside the cylindrical piece P2. By acting on the screw 555, we move the cylindrical piece P2 axially in relation to the central piece P3. Thanks to the tapered extremity of the cylindrical piece P2, we can then easily modify the widths of the outlet rings and in particular that of the water outlet ring to adjust the losses of charge.

Furthermore, in this configuration, at the level of the inlet of the separation chamber 550, means of introducing or withdrawing a gas have been added, preferably at the level of the axis of the separation chamber 550. These means are comprised of a piping 550 that is coaxial to the separation chamber 550 and passes through the stabilizing ogive 524. The gas that is present in excess in the emulsion is separated by a centrifuge effect and a free surface 562 is created in the device. This free surface makes it possible to limit the extension of the solid rotation liquid area and therefore the frictions and the turbulence. In the case of gas that is naturally present in the emulsion, an outlet 561 must be installed, preferably axially to extract this excess gas. In the case of a non charged emulsion of gas, we can add a small quantity of gas at the inlet of the device in order to create the free surface 562 and thus avoid the frictions. To give an order of size, we can accept a gas volume flow rate equal to 1% of the total flow entering in the device. This gas is found integrally in the outlet of the light fluid.

FIG. 6 shows a stationary device equipped with a gas or air injection designed to reduce the frictions.

The central piece that serves to bound the second annular orifice has the basic shape of a hollow cylinder 645 that is coaxial to the separation chamber 650 and extends from the inlet to the outlet of the latter. This cylinder 645 is, at the level of the outlet of the separation chamber 650, capable of recuperating the light fluid for its evacuation, using for example a grid 640 through which the light fluid can pass, the extremity close to the cylinder 645 then being obstructed.

This device is designed to perform a separation of phases in an oil well. The mixture enters in the separator through the piping 644 following the arrows 643. It then passes in the perforations or bladings with a progressive acceleration 632, then in the separator itself 650 whose external wall 600 does not rotate. The cylinder 645 then surrounds itself with a gas sheath.

The outlet rings bound by the circles 601, 602 and 603 are analog to those of FIG. 1. The heavy liquid, water in this case, passes in the chamber 604, then in the evacuation conduit 615 after having passed through the grid 647. The oil enters the chamber 605 after having passed through the aspiration ring. It passes through the grid 640 and goes back through the cylinder 645 that meets up with the ogive 624 and comes out following the arrow 642. This cylinder is sheathed in gas, where the gas cylinder 648 is very close to its external wall. If necessary, we inject a flow of artificial gas making it possible to create this sheath. It is all installed in an oil pipe 646, where the necessary watertightness between the flow of mixture and the output of water is obtained with a gasket 641. Of course, if necessary, the oil evacuation cylinder 645 can be located on the same side as the water evacuation piping, but this method of execution is not represented.

FIG. 7 illustrates a device as set forth in the invention equipped with means for detecting or measuring the presence of small quantities of light liquid in the heavy liquid.

The emulsion penetrates in 721, then through tangential inlets 722 in the separation chamber 724 bound by the wall 723. The heavy liquid comes back out of the separation chamber through the first annular orifice or ring 710, then the calibrated orifices 712 that set the flow of the main fluid. The light liquid comes exits the chamber through the second annular orifice or ring 711.

The orifice 711 opens into a first measuring chamber 714 that communicates through capillary tubes 716 with a second measuring chamber 715 equipped with an orifice 726. A first differential pressure sensor 730 is arranged between the first and the second measuring chambers 715 and 716. A second differential pressure sensor 731 is arranged between the second measuring chamber and the medium 725 in which the orifice opens 726.

The heavy liquid, after passing through the ring 711, penetrates in the chamber 714 then in several capillary tubes 716 and enters into the chamber 715. It is evacuated into the medium 725 through the calibrated orifice 726. Advantageously, we take care to arrange a central gas evacuation pipe 720 in the central piece if the fluid is likely to contain gas. The principle of the detection method consists in measuring the losses of charge of the capillaries 716 and the orifice 726 using the differential pressure sensors 730 and 731. The capillaries 716 are long enough and their diameter is small enough for there to be a laminary flow, characterized by a Reynolds number of less than 1000, in which the loss of charge is proportional to the flow of fluid and its viscosity. As to the orifice 726, it is quite short so that its loss of charge is proportional to the square of the flow and the density of the fluid that passes through it. When the fluid is viscous, the loss of charge in the capillary tubes will be proportionally more significant than that of the orifice 726 than when the fluid is less viscous. Measuring the loss of charge $\Delta p_2$ of the outlet orifice 726 with a section S makes it possible to determine the flow Q of fluid with a density p given by $$Q = \sqrt{\frac{2\Delta p_2}{p}}$$

Measuring the loss of charge $\Delta p_1$ at the terminals of the plurality of N capillary tubes with a diameter D gives the viscosity $\mu$ of the fluid by application of the formula:

$$\mu = \frac{\pi D^4 \Delta p_1}{128 L \frac{Q}{N}}$$

In general, the differences in density between the fluids are sufficient so we can concentrate the light liquid phase and determine its viscosity in order to thus know if there are traces of light fluid in the emulsion that penetrates in the separator.

FIGS. 8a and 8b represent another device as set forth in the invention that makes it possible to detect or measure the presence of light liquid in a heavy fluid according to another method that consists in increasing the initial concentration $C_e$ of light liquid by passing the mixture in a separator.

This method once again uses a cyclonic separator, rotating or not, and is represented in FIGS. 8a and 8b. Under these conditions, the liquid that exits through the second annular orifice or center ring 811 designed for the light liquid, contains a quantity of light liquid that is greater than that of the heavy liquid that exits through the first annular orifice or external ring 910. The corresponding concentration $C_s$ is equal to the product of the initial concentration $C_e$ by the efficiency of separation of the separator η and the ratio of the total flow entering the separator Q to the flow q extracted by the outlet of the light liquid.

$$C_s = \eta C_e \frac{Q}{q}$$

We then use more traditional measuring devices capable of measuring the presence of small quantities of light fluid and no longer just traces.

FIGS. 8a and 8b give an example of such a device based on a measure of resistivity. The liquid enters into the separator through slots 822, passes in the separation chamber 850, then comes back out through the rings 810 and 811.

The heavy fluid, whose flow is predominant, passes in the ring 810, then in the chamber 804 and is evacuated in the outside medium through a plurality of calibrated pipings 831 of which at least one is equipped with a measuring device.

The light fluid, consisting of a mixture of heavy fluid and light fluid in the form of droplets 825 whose concentration is equal to $C_s$ passes, through the ring 811, then in the chamber 805 and in the piping that is also calibrated 830 and comes out in the outside medium.

The fact of arranging the calibrated piping makes it possible to maintain a constant rate of flow between the two output flows. The gas that may be present is evacuated through a central pipe 820.

Two probes 832 and 833 are arranged in one of the calibrated pipings 831, one (832) at a point that is close to the chamber 804 and the other (833) at a point that is close to the exterior. These probes 834 and 835 are connected to another resistance measuring device 841 by electric conducers 836 and 837.

Similarly, two probes 834 and 835 are arranged in the piping 830, one (834) at a point that is close to the chamber 805 and the other (835) at a point that is close to the exterior. These probes 834 and 835 are connected to another resistance measuring device 841 via conducers 838 and 839.

The fluid that passes in the piping 830 with a concentration in light fluid supposed to be non conducer that is greater than that of the fluid that passes in the piping 831 has a higher resistivity that is based on this concentration. Therefore we can deduce from this measuring, after a previous calibration, the concentration in light fluid of the fluid passing in the piping 830. Knowing the ratio of the output flows, we can calculate the concentration in the liquid that enters the separator. The measuring of resistance is provided as a example. The man of the art will be able to choose other methods, possibly better adapted, such as capacitive methods or methods by absorption of electromagnetic radiation. In general, we perform differential measurements as they are more precise than direct measurements. In particular this method can be used at the bottom of an oil well.

As an example, we can implement a separator with a 20 mm diameter and a length of 200 mm, whether rotating or not. The flow of fluid to be analyzed will be of 0.4 liter per second and the flow extracted by the output of light liquid will be of 4 milliliters per second.

FIGS. 9a and 9b represent another variant of the device as set forth in the invention that is of great interest during the exploitation of an oil well.

Indeed, during their exploitation, oil wells produce emulsions that are richer and richer in water. With the traditional techniques of production, this water is evacuated at the wellhead along with the oil that is produced. It must then be separated in installations on the ground then reintroduced into the soil, at depths that are different from the layer that contains oil.

Therefore, these techniques consist in implementing stationary cyclones whose performances in separation are poor, the flows are limited and do not allow for significant variations of the flow rate. This makes it mandatory to use, on the more productive wells, up to approximately twenty parallel devices, where each one can be associated to a finishing cyclone. For example, in the case of a well that produces 20000 barrels per day (BPD), we must foresee implementing a set of cyclones that could reach 40 devices.

It is followed by a large complexity of piping arrangements and therefore, very high investment and operating costs.

The device in FIGS. 9a and 9b makes it possible to resolve these problems by separating the oil and the water at the bottom of the well, then by reintroducing the water in an adapted geological formation, preferably by making is pass through a pump. The oil, which can still contain a certain quantity of water, is then transported toward the surface naturally or through a pump, depending on whether the well is eruptive or not.

Therefore it calls for separators with small diameters, but with performances in separation that are sufficient to guarantee that the reinjected water now only contains very small quantities of oil, for example less than 300 mg/l.

As can be seen in FIGS. 9a and 9b, the separator is placed between a stage of the oil pump and a stage of the water pump in an oil well, where the motor of the unit of these rotating machines is located at the lower extremity of the water pump. The mixture is introduced through the upper part of the device, the water is thrown back into the lower part and introduced in the water pump, and the oil is also thrown into the lower part and carried back toward the top through piping located between the external shell of the separator and the production well pipe.

In referring to FIG. 9a in particular, we see an external pipe 901 that delimits the walls of the well, in which are installed on a same shaft line driven by a motor 905, an oil pump 902, a rotating separation chamber 903 and a water pump 904. The mixture to be separated penetrates into the device from the top following arrows 906, comes down in the clearance arranged between the body of the oil pump 902 and the pipe 901, penetrates at the upper part of the separation chamber 903, continues its way towards the bottom in this separation chamber following arrow 907. The mixture is separated in this area under the effect of the centrifugal forces where the water is evacuated through the lower part of the separation chamber 903 and penetrates into the water pump 904, then toward a geological formation located below the unit of the device following the arrow 908.

The oil is also extracted in the lower part of the rotating separation chamber 903 and captured in the collection chamber 931, but then goes back up toward the top before penetrating into the pump 902 and being evacuated toward the surface following arrows 909 (FIG. 9a) in piping provided for this reason.

In FIG. 9b, we see more details of the fluids' circuits in the separation area. The mixture enters the separation area following the arrows 906. First it passes in a stationary partitioned distributor 912 which allows it to cross paths with the flow of oil extracted at the outlet of the separation chamber 903, without the two fluids mixing together, thanks to an appropriate arrangement of the partitions of the distributor 912. It then penetrates in the distributor with fins 913, then in the clearance 914 arranged between the separator's external stationary shell 940 and a first rotating shell 941. In this annular clearance, the mixture undergoes a first rotation by friction on the rotating wall. It then passes in the grid 915 located close to the outlet of the separation chamber 903 and perforated by elongated holes perpendicularly to the axis of the chamber 903 then comes back toward the entrance of the chamber 903 between the shell 941 and the shell 942 which are both rotating. Therefore, the mixture is thrown by friction in rotation in the clearance between the shells during its course.

It is then introduced in the rotating separation chamber 903 through a plurality of radial orifices 917 located at the entrance of this chamber, where these orifices combined with this throwing procedure, make it possible to feed the internal chamber of the separator with a tangential velocity at the inlet that is exactly equal to the peripheral tangential velocity of the rotating separator. In this rotating chamber a cyclonic flow is created and is characterized by an acceleration of the tangential velocity toward the axis of the device. The conditions of acceleration that prevail therein are such that the light fluid tends to move toward the center and the heavy fluid tends to stay at the circumference. When we reach the outlet of the device, the two flows of light and heavy fluids are separated and are extracted through orifices 919 and 920, where the extraction orifice or ring 919 is located outside the orifice or ring 920, and where the water, more dense, passes in the ring 919 and the oil, which usually still contains a little water, passes in the ring 920. The oil that is extracted then passes, following the arrows 921, in the annular clearance located between the stationary external shell 940 of the separator and the pipe 901 that bound the well. It is then sent toward the pump 902 following the arrows 924 toward the outside of the well and passes in particular through the stationary partitioned distributor 912, a point where it crosses the flow of mixture that is heading toward the separation chamber. The water is evacuated through the ring 919 and sent following the arrows 922, then 923 toward the pump 904 and toward the geological formation where it is reinjected following the arrows 908.

The rotating unit formed by the oil pump 902, the separation chamber 903, the water pump 904, the collection chamber 931, the shells 941, 942 and the pieces P1, P2 and P3 is supported by the bearings 925 and 929, protected by the mechanical seals 926 and 928. Therefore, it has the advantage of being aligned and is driven by rotating means, in this case, the motor 905. The device as set forth in the invention can then have a small diameter and be sized in such a way that it can be installed inside the pipe 901 that makes up the wall of the well.

FIG. 10 represents a variant of the device of FIGS. 9a and 9b in which the extraction of oil takes place through an axial piping 950. The emulsion feeding is simpler than the previous one since it is not necessary to implement a crossed flow of oil and emulsion. Indeed, the emulsion is introduced in the separator 953 following the arrows 956. It then passes successively in 963, 964, 965 and 966 as in the example in FIGS. 9a and 9b. The feeding of the rotating separator 968 takes place through radial orifices 967. The extraction of the water is done in a manner that is analog to the previous description, the extraction of the oil is done from the inside of the axial piping 950. The path of the oil follows the arrows 971. First it passes through the orifice 970 then comes backward to penetrate the piping 950. The oil is extracted from this piping through radial orifices 951, then is injected in the pump 952 following the arrows 974.

FIGS. 11a and 11b give an example of layout of the device as set forth in the invention in an oil field. The mixture whose phases we want to separate is previously homogenized in order to avoid fluctuations of the relative concentration of the various elements, gas, oil and water in particular in the case of an oil drilling. In particular these fluctuations can come from the formation of diphasic flows of the "slug" type. If they do occur, they require the measuring of the device for extreme concentration conditions. Therefore the solution consists in installing a mixer. According to the invention, this mixer consists of a conduit 1152 at the two open extremities, coaxial to the separation chamber 1106 of the separation device as set forth in the invention 1131 and formed by two perforated tubes mounted end-to-end and where the volume of at least one of them is of the same size as that of the one that corresponds to the flow that passes between the two concentration fluctuations in one of the species of lower frequency, for example the largest slugs. These tubes communicate with each other and contain multiple orifices distributed lengthwise. In the example represented in FIGS. 11a and 11b, the mixer 1152 is positioned before the separation and pumping unit formed by the motor 1118, the water pump 1133, the separation device as set forth in the invention 1131, and the oil pump 1132, where the oil is evacuated toward the surface in the piping 1156 that communicates with the central pipe of the device as set forth in the invention and the water leaves the rotating pipe of the device as set forth in the invention and is evacuated, via the evacuation chamber 1115, in the formation 1171 located at a lower altitude.

The operation of the mixer is illustrated in FIG. 11b where we represent a fluid plug 1170 that penetrates in a first stage of the mixer formed by a conduit 1152 elongated in the direction of the main piping 1150, pierced with a plurality of inlet orifices 1154 and outlet orifices 1155. The inlet orifices 1154 are located in said first stage. Means of separation 1151 define a second stage in which are located the outlet orifices 1155. Preferably, the inlet orifices 1154 and outlet orifices 1155 are distributed evenly lengthwise on this elongated conduit 1152, so that the fluid plug heads toward the inside of this conduit through inlet orifices 1154 and partially outside of this conduit in the annular clearance 1171 formed between the conduit 1152 and the pipe that make up the wall of the well. The result is that the plug 1170 has a tendency to mix with the fluid contained in the conduit 1152, which tends to homogenize the concentrations and create globules of smaller dimensions. The fluid that is premixed in this manner comes back out through orifices 1155 that are calibrated so that the emulsion produced is formed of globules 1173 small enough to avoid the formation of a new plug before entering the separator 1131. The dimensioning of these orifices is done, for example, by applying the equations of Hinze and Kolmogorov pertaining to turbulent mixtures.

What is claimed is:

1. Device for separating the components of a heterogeneous mixture, where this device comprises a separation chamber with at one of its extremities an inlet and at the other of its extremities an outlet comprising a first annular orifice coaxial to said chamber and a second annular orifice coaxial to said first annular orifice and whose outside diameter is less than the inside diameter of said first annular orifice, characterized by the fact that said separation chamber includes a cylindrical shape and by the fact that the outside diameter of said first annular orifice is less than the inside diameter of said chamber and the fact that the outlet of the separation chamber further includes:

a peripheral annular first piece, that extends from the wall of the separation chamber toward a central longitudinal axis of the chamber, a second piece that is essentially cylindrical, a central third piece with a circular transversal section, where the essentially cylindrical piece is arranged between the peripheral annular piece and the central piece, and wherein the first, second, and third pieces are coaxial to the separation chamber so that the first annular orifice is comprised by the space between the peripheral annular piece and the essentially cylindrical piece and the second annular orifice is comprised by the space between the essentially cylindrical piece and the central piece.

2. Device as set forth in claim 1, characterized by the fact that the outside diameter of the second annular orifice is greater than 0.3 times the inside diameter, of the separation chamber.

3. Device as set forth in claim 1, characterized by the fact that the outside diameter of the first annular orifice is greater than 0.4 times the inside diameter of the separation chamber.

4. Device as set forth in claim 1, characterized by the fact that first annular orifice opens into a collection chamber that communicates with an evacuation pipe.

5. Device as set forth in claim 4, characterized by the fact that the collection chamber is integral in rotation with the separation chamber and is equipped with orifices that open into an intermediary chamber whose wall is free in rotation in relation to the separation chamber and is equipped with a grid that opens into the evacuation pipe.

6. Device as set forth in claim 1, characterized by the fact that the inlet to the separation chamber includes, in its wall, perforations making it possible to introduce the mixture.

7. Device as set forth in claim 5, characterized by the fact that the perforations are convergent canals that open tangentially into the separation chamber.

8. Device as set forth in claim 5, characterized by the fact that the inlet to the separation chamber is equipped with an obturator that is movable in relation to this chamber and arranged so as to obstruct all or part of the perforations.

9. Device as set forth in claim 1, characterized by the fact that the separation chamber is equipped at its inlet with a tapered or ogival part coaxial to the separation chamber and attached to the latter.

10. Device as set forth in claim 1, characterized by the fact that it further includes a shell integral with the separation chamber that extends over a part of this chamber from its inlet and surrounds it leaving an annular clearance between the separation chamber and the shell.

11. Device as set forth in claim 10, characterized by the fact that the shell is equipped with orifices for introducing the mixture.

12. Device as set forth in claim 1, characterized by the fact that the shell is surrounded by an envelope whose shape is essentially cylindrical from which it is separated by an annular space, where this envelope is free in rotation in relation to the separation chamber, extending beyond the shell along the axis of the separation chamber and equipped with perforations that allow the mixture to enter between the separation chamber and the envelope then in the annular clearance.

13. Device as set forth in claim 1, characterized by the fact that it also includes means to drive the separation chamber in rotation.

14. Device as set forth in claim 1, characterized by the fact that the separation chamber includes, at the level of its inlet, a diameter that is greater than that of the remainder of the separation chamber.

15. Device as set forth in claim 1, characterized by the fact that the inlet of the separation chamber includes means for introducing or withdrawing a gas, where these means are located at the level of the axis of the separation chamber.

16. Device as set forth in claim 15, characterized by the fact that the means include a piping that is coaxial to the central longitudinal axis of the separation chamber.

17. Device as set forth in claim 1, characterized by the fact that the essentially cylindrical piece includes a tapered extremity on the side of the separation chamber.

18. Device as set forth in claim 1, characterized by the fact that the central piece includes a part whose shape is a full cylinder.

19. Device as set forth in claim 1, characterized by the fact that central piece includes an axial length that is less than that of the cylindrical piece.

20. Device as set forth in claim 19, characterized by the fact that the central piece is extended by a tapered part and includes at least two fins.

21. Device as set forth in claim 1, characterized by the fact that it also includes:
    a collection chamber in which opens the first annular orifice;
    an oil pump; and
    a water pump;
and characterized by the fact that said oil pump, said separation chamber, said water pump, said collection chamber, said first piece, said second piece, and said third piece form an aligned set.

22. Device as set forth in claim 21, characterized by the fact that it also includes means for rotationally driving said aligned set.

23. Device as set forth in claim 22, characterized by the fact that it is sized in such a way that it can be installed in a pipe that constitutes the wall of an oil well.

24. Device as set forth in claim 1, characterized by the fact that the central piece is equipped with a central gas evacuation pipe.

25. Device as set forth in claim 1, characterized by the fact that the central piece is essentially shaped like a cylinder that is coaxial to the separation chamber, and that extends from the inlet to the outlet of the latter, and that can, at the level of the outlet of the separation chamber recuperate a light fluid.

26. Device as set forth in claim 1, characterized by the fact that:
    the second orifice is extended by a first measuring chamber that communicates using capillary tubes with a second measuring chamber equipped with a third orifice;
    a first differential pressure sensor is arranged between the first and second measuring chambers; and
    a second differential pressure sensor is arranged between the second measuring chamber and the medium into which opens the third orifice.

27. Use of a device as set forth in claim 26 or for detecting and/or measuring the light fluid contained in a heavy fluid.

28. Device as set forth in claim 1, characterized by the fact that
    the first orifice opens into a first chamber that communicates with first calibrated piping that opens into the external medium,
    the second orifice opens into a second chamber that communicates with second calibrated piping that opens into the external medium;
    two probes are arranged in one of the first and second calibrated pipings, where one of said two probes is located at a point close to the first chamber and the other of said two probes is located at a point that is close to the exterior medium; these two probes are connected to a measuring device;
    two additional probes are arranged in the other one of said first and second calibrated pipings, where one of said two additional probes is located at a point close to the second chamber and the other of said two additional probes is located at a point that is close to the exterior medium; these two additional probes are connected to a measuring device.

29. Device as set forth in claim 1, characterized by the fact that it is preceded by a mixer that comprises:
    a conduit coaxial to the separation chamber, whose two extremities are open and includes inlet orifices and outlet orifices axially distanced from said inlet orifices;
    means of separation that define a first stage and a second stage, arranged in such a way that said inlet orifices are located in the first stage and said outlet orifices are located in the second stage.

30. Use of a device as set forth in claim 1 for separating a mixture of water and oil.

31. Use of a device as set forth in claim 1 for separating a mixture of water and oil at the bottom of an oil well.

32. Procedure for separating the components of a heterogeneous mixture, comprising:
    introducing the mixture to be treated at an entrance of a device that comprises a separation chamber with at one of its extremities an inlet and at the other of its extremities an outlet that includes a first annular orifice coaxial to said chamber, and a second annular orifice coaxial to said first annular orifice and whose outside diameter is less than the inside diameter of said first annular orifice, where said separation chamber includes a cylindrical shape and the outside diameter of said first annular orifice is less than the inside diameter of said chamber, and the outlet of the separation chamber further includes:

a peripheral annular first piece, that extends from the wall of the separation chamber toward a central longitudinal axis of the separation chamber, a second piece that is essentially cylindrical, a central third piece with a circular transversal section, where the essentially cylindrical piece is arranged between the peripheral annular piece and the central piece, and wherein the first, second, and third pieces are coaxial to the separation chamber so that the first annular orifice is comprised by the space between the peripheral annular piece and the essentially cylindrical piece and the second annular orifice is comprised by the space between the essentially cylindrical piece and the central piece; and recuperating a heavy fraction through said first annular orifice and a light fraction through said second annular orifice.

33. Procedure as set forth in claim 32, characterized by the fact that the mixture to be treated is introduced in the inlet of said separation chamber in such a fashion that it has the same angular velocity as that of this separation chamber.

* * * * *